United States Patent [19]

Chao

[11] Patent Number: 4,775,162
[45] Date of Patent: Oct. 4, 1988

[54] SWINGABLE SKATEBOARD

[75] Inventor: Jung-Hsiang Chao, Taoyuan Hsien, Taiwan

[73] Assignee: Sun Craft Industrial Co., Ltd., Taiwan

[21] Appl. No.: 77,236

[22] Filed: Jul. 24, 1987

[51] Int. Cl.⁴ ............................................. B62K 9/00
[52] U.S. Cl. ............................. 280/87.04 R; 280/267
[58] Field of Search ................ 280/87.04 R, 87.04 A, 280/8.01, 263, 267, 272, 11.2

[56] References Cited

U.S. PATENT DOCUMENTS

| 4,138,131 | 2/1979 | Sommer | 280/272 X |
| 4,140,326 | 2/1979 | Huber | 280/11.2 |
| 4,460,187 | 7/1984 | Shimizu | 280/87.04 A X |

FOREIGN PATENT DOCUMENTS 1957 of 1900 United Kingdom.
2048180A 12/1980 United Kingdom.

Primary Examiner—David M. Mitchell
Assistant Examiner—Tamara L. Finlay
Attorney, Agent, or Firm—Marshall & Melhorn

[57] ABSTRACT

A swingable skateboard includes a generally flat base board which has a somewhat upwardly curved tail end. The tail end of the board is equipped with a rubber cushion which serves as a brake device. A crank member includes a rotating shaft journalled on the leading end of the board, and a crank arm to which a front axle is secured. A handle assembly including two interconnecting handlebars and a steering column which is secured removably and coaxially to the rotating shaft of the crank member. The crank member may be fastened onto the board for preventing relative movement therebetween for use as a conventional skateboard. When the handlebars are rotated, the board can be swung.

2 Claims, 7 Drawing Sheets

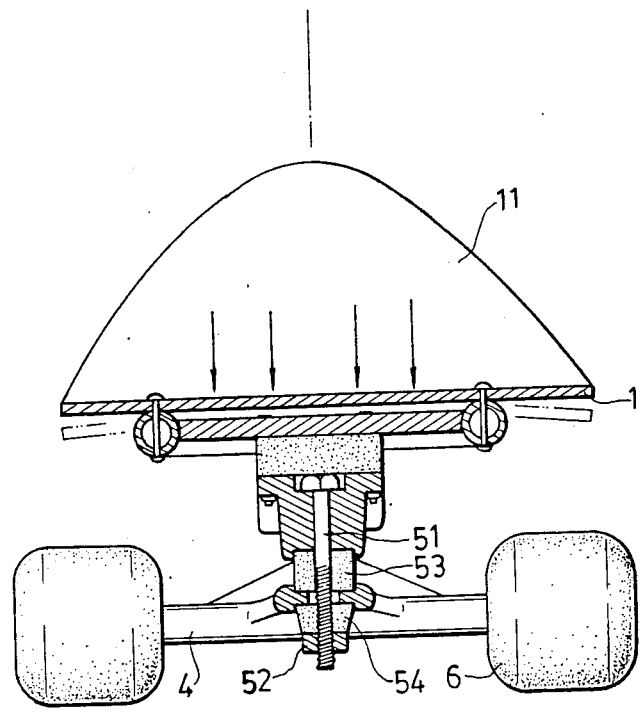
F I G. 13
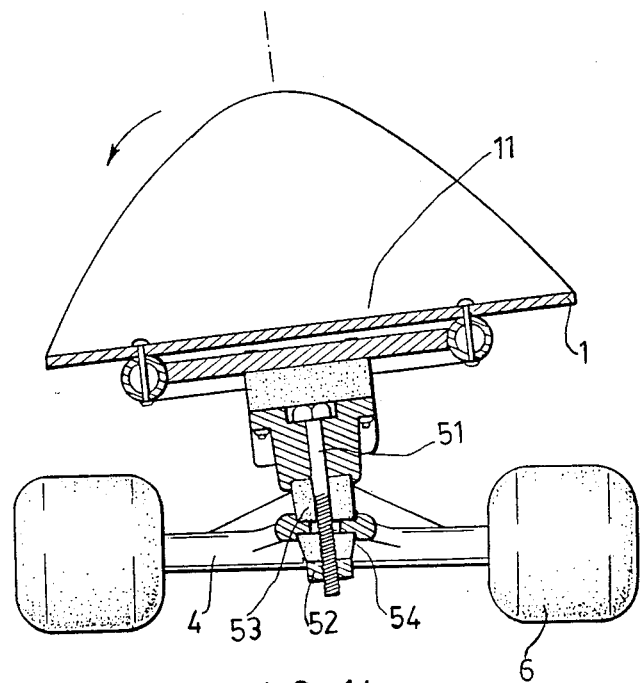
F I G. 14

SWINGABLE SKATEBOARD

BACKGROUND OF THE INVENTION

The present invention relates to a skateboard, more particularly to one on which there is mounted a handle assembly rotatable relative to the base board to swing the base board.

It is well known that riding a skateboard is a fun form of exercise. However, a healthy level of exercise is difficult to achieve when using the conventional skateboard. In addition, the method of riding a conventional skateboard is monotonous.

SUMMARY OF THE INVENTION

It is therefore an object of the present invention to provide a swingable skateboard which can provide a healthy level of exercise to the entire body of the user.

It is another object of the present invention to provide a swingable skateboard effective for exercising the rider's balance.

According to the present invention, the swingable skateboard includes a generally flat base board; a pair of rear rollers journalled on a tail end portion of the base board; a bearing means mounted on a leading end portion of the base board; a crank member including a generally vertical rotating shaft journalled somewhat obliquely on the leading end portion of the base board by the bearing means, and a generally horizontal crank arm secured to the lower end of the rotating shaft; a pair of front rollers; a front axle carrying rotatably the front rollers on the opposite ends thereof and connected securely to the crank arm of the crank member at an intermediate portion of the front axle; a handle assembly including two interconnecting handlebars, and a steering column connected securely to the lower ends of the handlebars; and a coupling means for connecting removably the steering column of the handle assembly to the rotating shaft of the crank member while preventing relative rotation therebetween.

Preferably, a fastening means is provided for fastening releasably the crank member onto the base board so as to prevent relative rotation therebetween. Whether the crank member is fastened onto the base board by the fastening means or not, the swingable skateboard can be ridden. However, as a safety precaution, when the handle assembly is removed from the base board, the crank member must be fastened onto the base board by the fastening means.

Consequently, when the handlebars are rotated, the axle carrying the front rollers will rotate and thus move relative to the base board causing the leading end portion of the base board to rise or fall.

In the preferred embodiment, a rubber cushion is provided on the underside of an upwardly curved tail end of the base board to form a brake means.

BRIEF DESCRIPTION OF THE DRAWINGS

Other features and advantages of the present invention will become apparent from the following detailed description of a preferred embodiment of the present invention with reference to the accompanying drawings in which:

FIG. 13 is a schematic sectional view illustrating the position of a pair of rubber bushings of the swingable skateboard according to the present invention;

FIG. 14 is a view similar to FIG. 13, showing a possible deformation of the rubber bushings when the swingable skateboard is ridden.

DETAILED DESCRIPTION OF THE PREFERRED EMBODIMENT

Figures 1, 3:
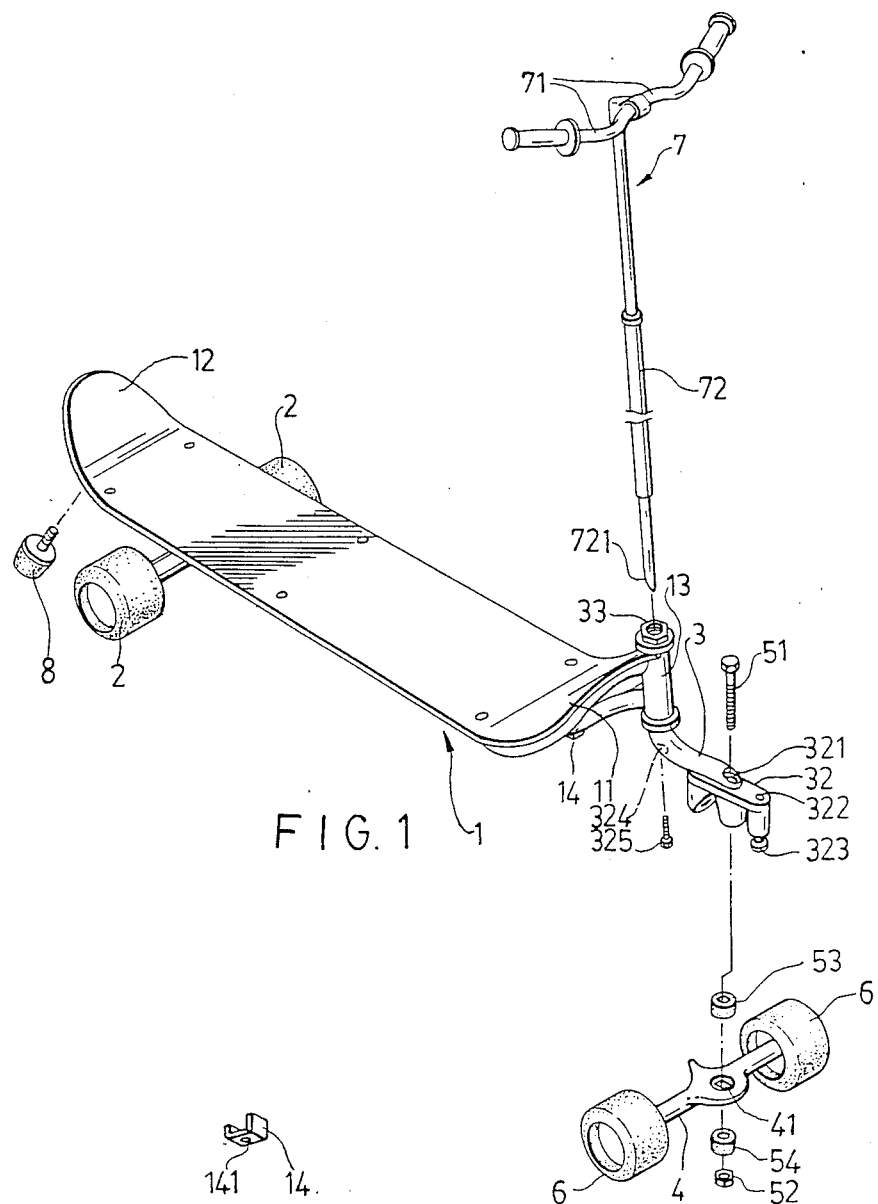
FIG. 1 is an exploded view of a swingable skateboard according to the present invention.
FIG. 3 is a perspective view showing a U-shaped bracket of the swingable skateboard according to the present invention.

Referring to FIG. 1, there is shown a swingable skateboard according to the present invention. The swingable skateboard includes a generally flat base board 1 which has upwardly curved leading end 11 and tail end 12. A pair of rear rollers 2 are journalled on the board 1. Secured to the leading end 11 of the board 1 is a circular sleeve 13 on which is journalled the rotating shaft 31 (see FIG. 2) of a crank member 3.

The crank member 3 includes a crank arm 32 which has a large tap hole 321 at an intermediate portion thereof for connecting rigidly with a front axle 4 having a hole 41 by a large bolt 51 and a nut 52. In addition to the nut 52, sleeved on the large bolt 51 are a pair of rubber bushings 53 and 54 which are positioned on both sides of the front axle 4. A pair of front rollers 6 are mounted rotatably on the opposite ends of the front axle 4. The crank arm 32 has at the end thereof a small tap hole 322 into which a small bolt 323 is inserted upwardly.

On the underside of the leading end 11 of the board 1, a U-shaped bracket 14 is provided with another small tap hole 141 (see FIG. 3) of a diameter the same as the small tap hole 322 of the crank arm 32. The crank arm 32 can be rotated to permit the small tap holes 322 and 141 to register with each other. Then, the small bolt 323 can be screwed through the small tap hole 322 of the crank arm 32 into the tap hole 141 of the U-shaped bracket 14 so that the front rollers 6 are aligned with the rear roller 2 and so that the front axle 4 can not move relative to the board 1.

Figure 2:
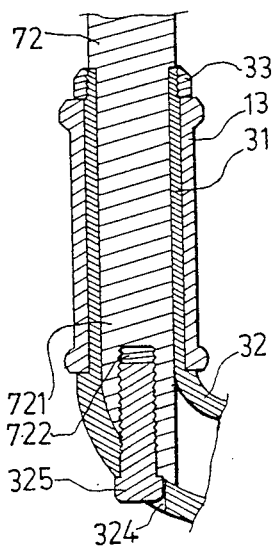
FIG. 2 is a schematic sectional view illustrating the engagement of a crank member with a steering column and with a board of the swingable skateboard according to the present invention.

A handle assembly 7 includes a pair of interconnecting handlebars 71 and a steering column 72. The steering column 72 has a tapered lower end 721. The crank member 3 has a generally L-shaped tubular portion (with particular reference to FIG. 2) which is formed with an outward flange 33 on the upper end thereof. A curved accommodating space is thus formed within the L-shaped tubular portion of the crank member 3 between the rotating shaft 31 and the crank arm 32 so that the tapered lower end 721 of the steering column 72 can be inserted tightly into the curved accommodating space, as shown in FIG. 2. Furthermore, the tapered lower end 721 of the steering column 72 is provided with a tap hole 722. The wall of the generally L-shaped tubular portion has a counterbore 324 which is opposite to the tap hole 722 of the steering column 72 when the steering column 72 is inserted into the crank member 3. After the steering column 72 is inserted into the crank member 3, a set screw 325 is provided for passing through the counterbore 324 of the crank member 3 into the tap hole 722 of the steering column 72 thereby connecting rigidly the handle assembly 7 to the crank member 3.

When the rider grips the handlebars 71, so long as the handlebars 71 are rotated, the crank member 3 will rotate synchronously with the handle assembly 7. A threaded rubber cushion 8 is screwed to the underside of the tail end 12 of the board 1. When the skateboard is moving, if the tail end 12 of the board 1 is depressed, the cushion 8 will contact the ground, thereby stopping the skateboard.

Figure 8:
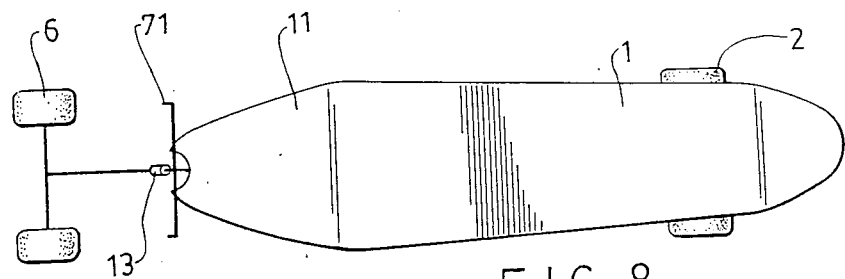
FIG. 8 is a schematic top view showing the swingable skateboard of the present invention, in which the front rollers are in the frontmost position.
Figure 9:
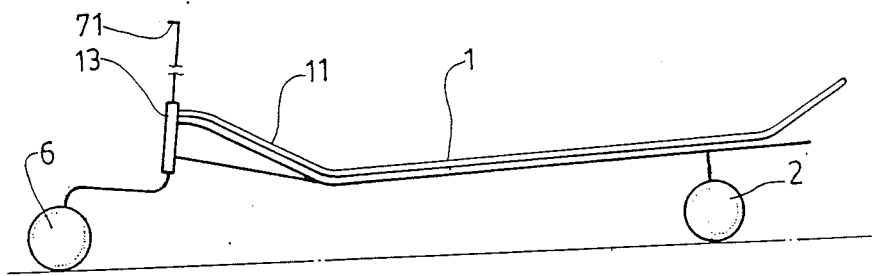
FIG. 9 is a schematic side view showing the swingable skateboard of the present invention, in which the front rollers are in the frontmost position.
Figure 10:
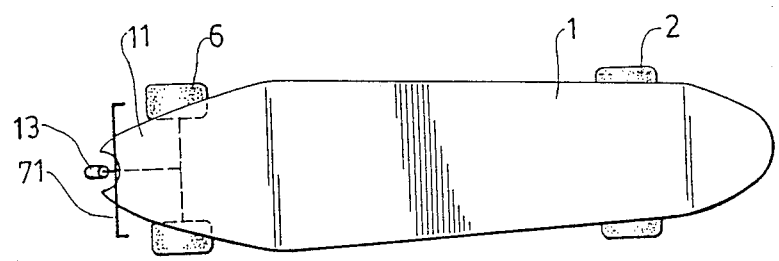
FIG. 10 is a schematic top view showing the swingable skateboard of the present invention, in which the front rollers are in the rearmost position.
Figure 11:
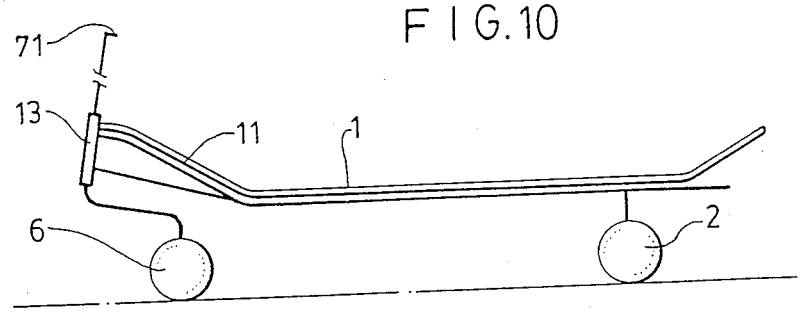
FIG. 11 is a schematic side view showing the swingable skateboard of the present invention, in which the front rollers are in the rearmost position.

In use, the handlebars 71 can be rotated through 360 degrees, as shown in FIGS. 4 to 7. Because the crank arm 32 of the crank member 3 is rotated on a plane, when the front rollers 6 are rotated to their frontmost position, as shown in FIG. 8, the leading end 11 of the board 1 is positioned at its lowermost position, as shown in FIG. 9. On the contrary, when the front rollers 6 are rotated to their rearmost position, as shown in FIG. 10, the leading end 11 of the board 1 is positioned at its uppermost position, as shown in FIG. 11, so that the intermediate portion of the board 1 is in a horizontal position. Accordingly, when the handlebars 71 are rotated, the center of the gravity of the rider standing on the board 1 will be changed causing the skateboard carrying the rider to move forwardly or rearwardly.

Figure 12:
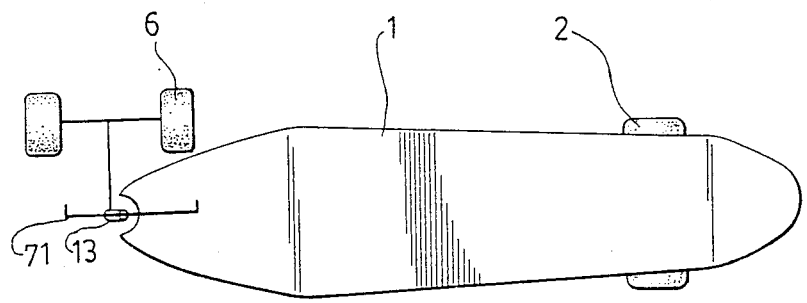
FIG. 12 is a schematic top view showing the swingable skateboard of the present invention, in which the front rollers are in the rightmost position.
Figure 5:
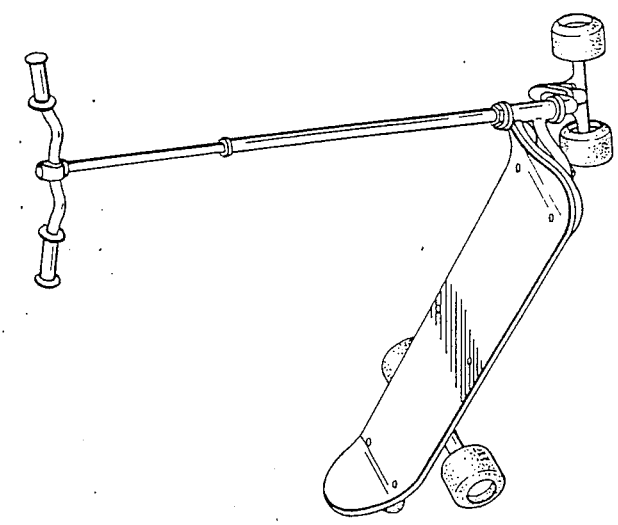
FIGS. 4 to 7 are perspective views showing the swingable skateboard of the present invention, in which a pair of front rollers are in different positions.
Figure 4:
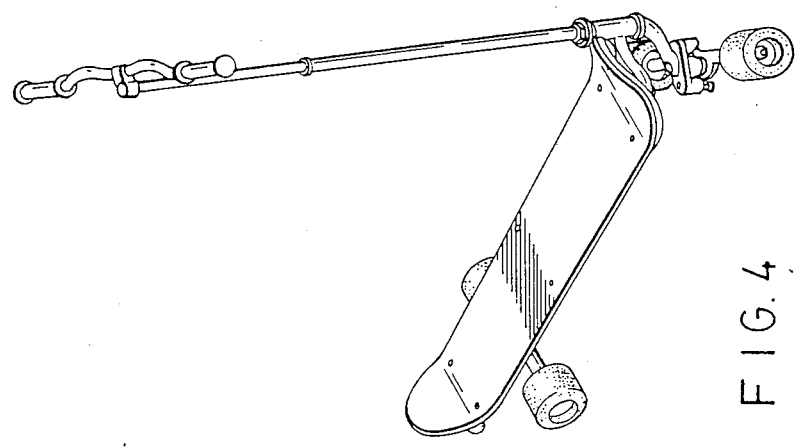
Figure 7:
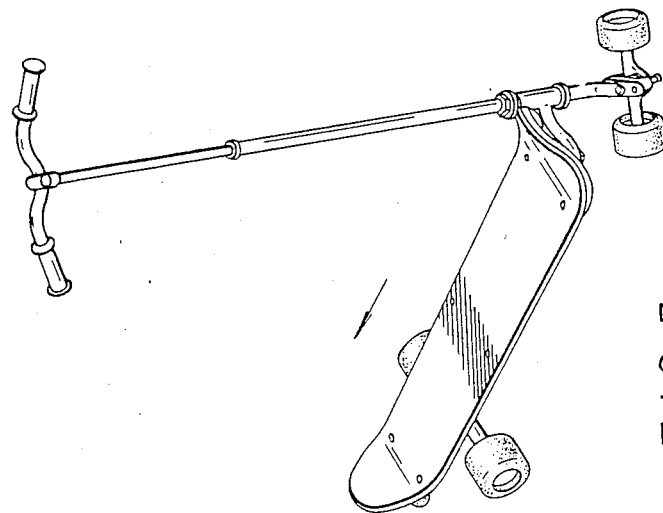
Figure 6:
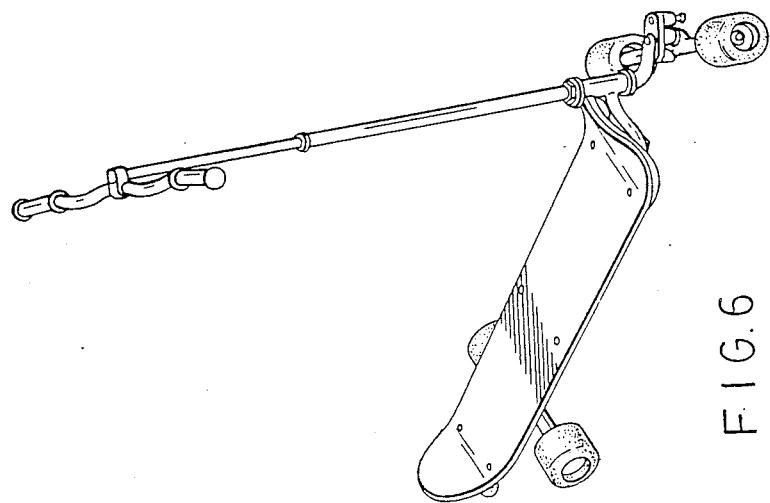

In addition to the swinging movement of the leading end 11 of the board 1, when the handlebars 71 are rotated, both sides of the board 1 also can be swung. Referring to FIG. 12, when the front rollers 6 are rotated to the rightmost, the center of the gravity of the rider standing on the board 1 will be changed to the right or left. That is to say, the whole board 1 can be swung. This swinging movement of the board 1 is very effective for exercising the rider's balance.

Referring to FIG. 13, when the board 1 is depressed, the rubber bushings 53 and 54 will deform, for example into the form shown in FIG. 14, so that the board 1 is swung. These bushings 53 and 54 can thus promote the effect of the balance exercise. It is understood that the difficulty of riding the skateboard according to the present invenion is significantly higher than that of riding the conventional skateboards.

It will be understood that the handle assembly 7 can be removed from the crank member 3. Then, by screwing the small bolt 323 through the small tap hole 322 of the crank member 3 into the tap hole 141 of the U-shaped bracket 14, the crank member 3 is fastened onto the board 1 so that the skateboard lacking the handle assembly 7 can be played in a known manner.

Figure 15:
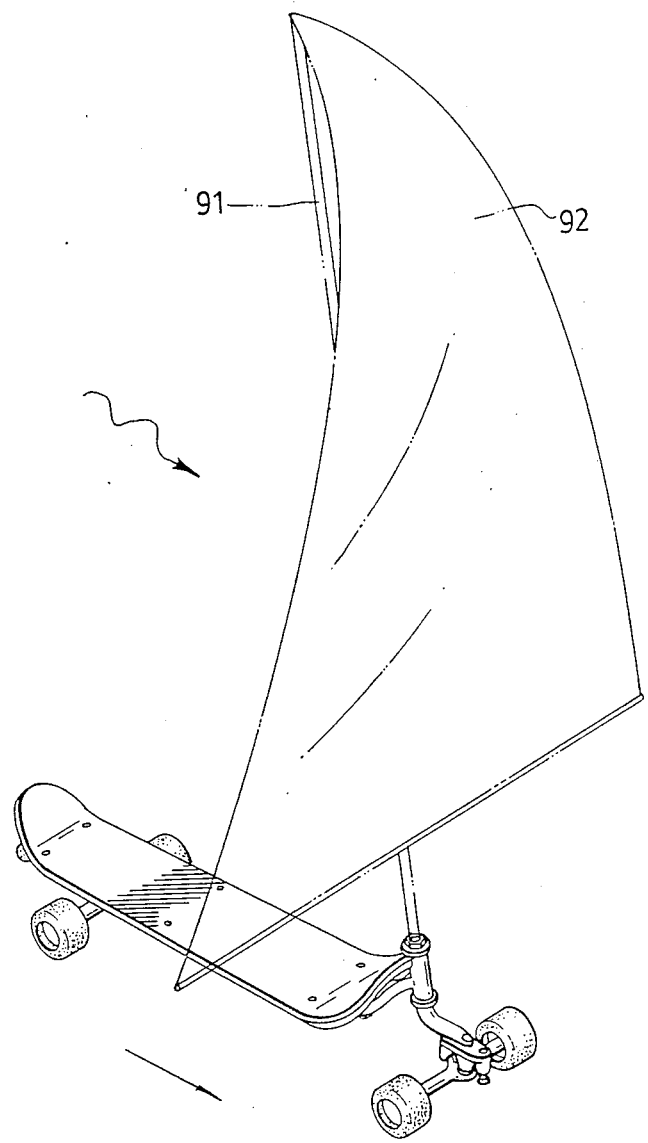
FIG. 15 is a perspective view showing the swingable skateboard of the present invention used with a mast carrying a sail.

Alternatively, if it is used in windy weather, the handle assembly 7 may be replaced by a mast 91 inserted into the crank member 3 and a sail 92 can be fastened on the mast 91, as shown in FIG. 15.

With the present invention thus explained, it is apparent that various modifications and variations can be made without departing from the scope and spirit of the present invention. It is therefore intended that the present invention be limited only as indicated in the appended claims.

What is claimed is:

1. A swingable skateboard comprising:
a generally flat base board;
a pair of rear rollers journalled on a tail end portion of said base board;
a bearing means mounted on a leading end portion of said base board;
a crank member including a generally vertical rotating shaft journalled somewhat rearwardly obliquely on said leading end portion of said base board by said bearing means, and a generally horizontal crank arm secured to said rotating shaft;
a pair of front rollers;
a front axle carrying rotatably said front rollers on the opposite ends thereof and connected securely to said crank arm of said crank member at an intermediate portion of said front axle;
a handle assembly including two interconnecting handlebars, and a steering column connected securely to said handlebars;
a coupling means for connecting removably said steering column of said handle assembly to said rotating shaft of said crank member while preventing relative rotation therebetween said coupling means including a generally L-shaped tubular portion forming a curved accommodating space in the tubular portion of said crank member between said rotating shaft and said crank arm, said generally L-shaped tubular portion having a counterbore in the wall thereof, a tapered lower end of said steering column of a shape conforming to that of the portion of said curved accommodating space within said rotating shaft for being inserted tightly into said curved accommodating space of said crank member, said tapered lower end having a tap hole opposing said counterbore of said generally L-shaped tubular portion and a set screw passing through said counterbore of said generally L-shaped tubular portion into said tap hole of said tapered lower end for connecting rigidly said handle assembly to said rotating shaft of said crank member;
a fastening means for fastening releasably said crank member onto said base board so as to prevent relative rotation therebetween;
whereby, when said handlebars are rotated, said front axle carrying said front rollers will rotate and thus move relative to said base board causing said leading end portion of said base board to rise or fall.

2. A swingable skateboard comprising:
a generally flat base board;
a pair of rear rollers journalled on a tail end portion of said base board;
a bearing means mounted on a leading end portion of said base board;
a crank member including a generally vertical rotating shaft journalled somewhat rearwardly obliquely on said leading end portion of said base board by said bearing means, and a generally horizontal crank arm secured to the lower end of said rotating shaft;

a pair of front rollers;

a front axle carrying rotatably said front rollers on the opposite ends thereof and connected securely to said crank arm of said crank member at an intermediate portion of said front axle;

a handle assembly including two interconnecting handlebars, and a steering column connected securely to the lower ends of said handlebars;

a coupling means for connecting removably said steering column of said handle assembly to said rotating shaft of said crank member while preventing relative rotation therebetween; and a fastening means for fastening releasably said crank member onto said base board so as to prevent relative rotation therebetween, said fastening means includes a first tap hole provided in the bottom surface of said leading end portion of said base board, a second tap hole provided in said crank arm of said crank member, and an adjusting bolt normally screwed to said second tap hole, whereby, when said crank arm of said crank member is rotated to a position so that said second tap hole of said crank member is brought into registry with said first tap hole of said base board, said adjusting bolt can be adjusted to pass through said second tap hole into said first tap hole for preventing said crank member from movement relative to said base board.

* * * * *

UNITED STATES PATENT AND TRADEMARK OFFICE
CERTIFICATE OF CORRECTION

PATENT NO. : 4,775,162

DATED : October 4, 1988

INVENTOR(S) : Jung-Hsiang Chao

It is certified that error appears in the above-identified patent and that said Letters Patent is hereby corrected as shown below:

On the Title Page, Item [73], delete "Sun Craft Industrial Co., Ltd." and insert --Jung-Hsiang Chao--

Signed and Sealed this

Sixteenth Day of May, 1989

*Attest:*

DONALD J. QUIGG

*Attesting Officer*     *Commissioner of Patents and Trademarks*